A. GESZTY.
CIGAR HOLDER.
APPLICATION FILED AUG. 30, 1918.

1,295,977.

Patented Mar. 4, 1919.

INVENTOR
Alexander Geszty.
BY
Alexander Hine
ATTORNEYS

UNITED STATES PATENT OFFICE.

ALEXANDER GESZTY, OF NEW YORK, N. Y.

CIGAR-HOLDER.

1,295,977.

Specification of Letters Patent.

Patented Mar. 4, 1919.

Application filed August 30, 1918. Serial No. 252,045.

*To all whom it may concern:*

Be it known that I, ALEXANDER GESZTY, a subject of the King of Hungary, residing at New York, in the county of New York and State of New York, have invented new and useful Improvements in Cigar-Holders, of which the following is a specification.

My invention relates to utensils for smokers, the invention being more particularly related to utensils of the type designed to hold cigars and cigarettes.

The principal objects of my invention are:—(1) to provide a holder which is adjustable in order to accommodate cigars differing in size and shape, and which is also capable of holding cigarettes; (2) to provide a holder which may be quickly adjusted by merely turning a thimble or adjusting ring; (3) to provide a holder which securely maintains the cigar or cigarette without interfering with the drafts of smoke therethrough; (4) to provide a holder easily disassembled for cleaning purposes and for enabling the replacement of the mouth piece or any other part which may become damaged or broken; and (5) to provide a holder which is simple in construction, comparatively inexpensive to manufacture, effective in use and easy to operate.

With the foregoing objects in view and others, the invention resides in the details of construction and in the arrangement and combination of parts hereinafter described, defined in the claims, and illustrated in the accompanying drawings, forming a part of this specification; and it will be understood that changes and alterations in the precise embodiment of the invention as herein disclosed, may be made, to which changes and alterations the inventor is entitled, provided the same are effected within the scope of what is claimed.

In the accompanying drawings:—

Figure 1:
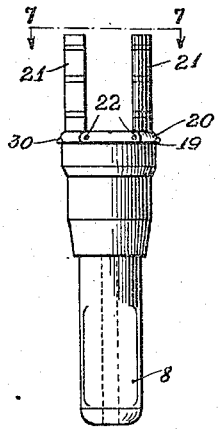
Figure 1 is a view in side elevation of my improved holder.
Figure 2:
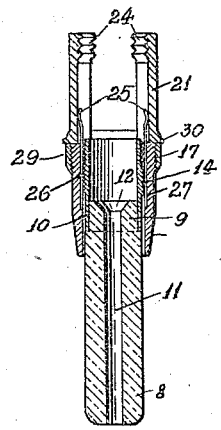
Fig. 2 is a longitudinal sectional view through the same.
Figure 3:
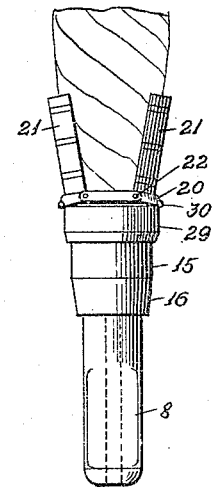
Fig. 3 is a side elevational view, illustrating how the fingers may be tilted outwardly to hold a cigar of relatively large size.

With more particular reference to the accompanying drawings, the numeral 8 denotes the mouth-piece or stem, formed at one end with a reduced portion 9, which fits snugly within the tubular coupling-piece 10 so as to be held by friction, but which may be threaded within the same or otherwise detachably connected thereto. The mouth-piece may be made of hard rubber, bone, or any other material ordinarily employed for the purpose, and it is provided longitudinally therethrough with the usual smoke aperture 11, which at its outer end within the reduced portion 9 is enlarged as at 12 to provide a recess or pocket receptive of the inner or butt end of a cigar or cigarette.

The coupling piece 10 is made preferably intermediate its length, with an exteriorly raised and threaded portion 13, which engages the threaded region 14 provided on the interior of the tubular body part or casing 15. Said coupling piece is shorter in length than the body part 15, and the latter, adjacent the threaded region 14, has a plain portion 15' receptive of the end of the mouth-piece 8.

Being fast with the mouth-piece, the coupling piece is advanced or withdrawn within the body part accordingly as the mouth-piece is turned, the relation of parts being such that the mouth-piece may be advanced with its remote or free end projecting beyond the remote end of the body part. At its inner or lower end, the body part 15 is preferably beveled as at 16 toward the mouth-piece. At its opposite or outer end, the body part 15 is exteriorly threaded as at 17, while beyond this threaded region the same terminates in spaced arcuate ears 18, to provide the confronting recesses 19, each receptive of the enlarged end 20 of an arcuate finger 21. Provision is thus made for the enlarged ends of the fingers to be seated in the confronting recesses between the ears so that the said fingers may be tilted toward and away from each other. The fingers 21 are hingedly engaged with the ears 18 by means of pintles 22, which are seated in suitable bores as 23 provided in registry in the said ears 18 and in the said enlarged ends 20. The outer ends of the fingers 21 are grooved or corrugated as at 24 in order to provide suitable means for gripping the cigars or cigarettes.

Bearing against the fingers 21 so as to tend normally to tilt them apart are the ends 25 of the springs 26, projecting from the body part 15, in which they are seated in appropriate recesses 27, and to which at their lower ends, the same are pinned as at 28, it being obvious that the springs must be seated deep enough to permit the proper threaded coöperation between the coupling piece 10 and the body part 15.

Figure 4:
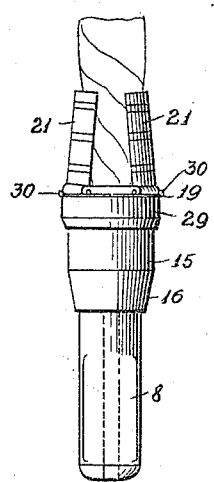
Fig. 4 is a similar view, but showing the fingers tilted inwardly to hold a relatively small cigar or cigarette.
Figure 5:
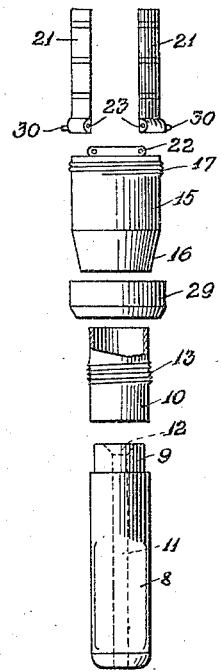
Fig. 5 is also a similar view, partly in section, showing the parts detached, but in proper relative position.
Figure 6:
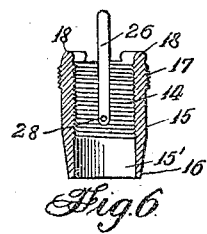
Fig. 6 is a sectional view through the body part illustrating in particular how the finger spring is arranged and secured.
Figure 7:
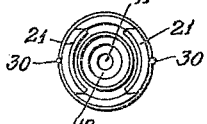
Fig. 7 is a top end view, taken on the line 7—7 of Fig. 1.

Mounted upon the body 15 is a thimble or ring 29, which is interiorly threaded to coöperate with the threaded portion 17 of the body. As the thimble is turned to advance outwardly, the outer end or edge thereof engages the pins 30, which project radially from the enlarged portions 20 of the fingers, whereby simultaneously, against the tension of the springs 26, to tilt the fingers inwardly toward each other, as may be necessary in order to engage and hold the cigar or cigarette as illustrated in Fig. 4. By turning the thimble in the opposite direction or inwardly, the springs 26 will be permitted to act, tilting the fingers away from each other, for the reception of a relatively large cigar, as illustrated in Fig. 1.

In order that the holder may be as small and light as possible, all of the parts, excepting the mouth-piece, are preferably stamped and fashioned out of thin sheets of metal such as tin, aluminum, brass, silver, gold and the like.

Having thus described my invention, what I claim is:—

1. A cigar holder comprising a tubular body adapted to receive a mouth-piece and formed at one end with confronting ears, spring-pressed fingers pivotally engaged between the ears and tilted normally away from each other, and means threaded upon the body adapted to engage said fingers and to hold them tilted toward each other, substantially as and for the purpose specified.

2. A cigar holder comprising a tubular body adapted to receive a mouth-piece and formed at one end with confronting ears, a pair of fingers pivotally engaged between the ears to tilt toward and away from each other, resilient means tending normally to tilt the fingers away from each other, and a thimble threaded upon the body adapted to engage said fingers and to hold them tilted toward each other, substantially as and for the purpose specified.

3. In a cigar holder, the combination with a tubular body formed at one end with confronting ears, of spring-pressed finger elements pivotally engaged between said ears and normally tilted away from each other, and means movable upon the body portion to engage said fingers and to hold them tilted toward each other in the position desired.

4. In a cigar holder, the combination with a tubular body formed at one end with confronting ears, of fingers pivoted between said ears to tilt toward and away from each other, said fingers being provided at their bases with projecting pins, spring means engaging the fingers to hold them normally tilted away from each other, and means movable upon the body to engage said pins and to hold the fingers tilted toward each other in the position desired.

5. A cigar holder comprising a tubular body formed at one end with confronting ears, means threaded within the interior of the body for holding a mouth-piece and for receiving the end of a cigar or cigarette, a pair of fingers hingedly engaged between the confronting ears to tilt toward and away from each other, resilient means tending normally to tilt the fingers away from each other, and a thimble threaded upon the body and adapted to engage said fingers and to hold them tilted in the position desired.

6. A cigar holder comprising a tubular body interiorly and exteriorly threaded near one end, means coöperating with the interior threads for holding a mouth-piece and for receiving the end of a cigar or cigarette, said body terminating at the threaded end in confronting ears, a pair of fingers hingedly engaged between the confronting ears and adapted to tilt toward and away from each other, said fingers at their bases being provided with projecting pins, resilient means for normally holding the fingers tilted away from each other, and means mounted upon the body and coöperating with the exterior threads thereof to engage said pins and to tilt the fingers toward each other and to hold them in the tilted position desired.

In testimony whereof I have signed my name to this specification.

ALEXANDER GESZTY.

In presence of—
ALEXANDER DENES.